United States Patent [19]

Ohashi et al.

[11] Patent Number: 4,635,597
[45] Date of Patent: Jan. 13, 1987

[54] STRUCTURE OF A MAIN COMBUSTION CHAMBER OF A DIESEL ENGINE OF A DIRECT INJECTION TYPE

[75] Inventors: Ryoichi Ohashi; Hitoshi Inaba, both of Chayamachi, Japan

[73] Assignee: Yanmar Diesel Engine Co., Ltd., Osaka, Japan

[21] Appl. No.: 691,767

[22] Filed: Jan. 16, 1985

[51] Int. Cl.$^4$ .............................................. F02B 23/06
[52] U.S. Cl. ..................................... 123/276; 123/263
[58] Field of Search ......................... 123/263, 276, 279

[56] References Cited

U.S. PATENT DOCUMENTS

| 3,083,700 | 4/1963 | Madak et al. .................... 123/276 |
| 4,176,628 | 12/1979 | Kanai et al. .................... 123/276 X |

FOREIGN PATENT DOCUMENTS

| 2407783 | 9/1974 | Fed. Rep. of Germany ...... 123/276 |
| 3004580 | 8/1981 | Fed. Rep. of Germany ...... 123/276 |
| 46214 | 4/1977 | Japan ................................... 123/276 |
| 71211 | 6/1979 | Japan ................................... 123/276 |
| 807712 | 1/1959 | United Kingdom ................ 123/276 |

Primary Examiner—Tony M. Argenbright
Attorney, Agent, or Firm—Bradford E. Kile

[57] ABSTRACT

The disclosure describes a structure of a main combustion chamber of a diesel engine of a direct injection type in which a main combustion chamber having a peripheral wall which includes a plurality of collision walls and guide walls which are disposed alternately to each other in a circumferential direction of the piston, characterized in that; each guide wall includes an upstream portion and a downstream portion with a boundary therebetween in the direction of the swirl, a radial distance from the center of the chamber to the boundary is shorter than a radial distance from the center of the chamber to other portions and each upstream portion has a longer radius of a curvature and a circumferential length than each downstream portion so that the inner periphery of the chamber has a pin-wheel-like shape.

8 Claims, 25 Drawing Figures

STRUCTURE OF A MAIN COMBUSTION CHAMBER OF A DIESEL ENGINE OF A DIRECT INJECTION TYPE

BACKGROUND OF THE INVENTION

The present invention relates to a structure of a main combustion chamber formed by a hollow at a top a piston of a direct-injection internal combustion engine.

Figures 1, 2, 2A, 3, 4:
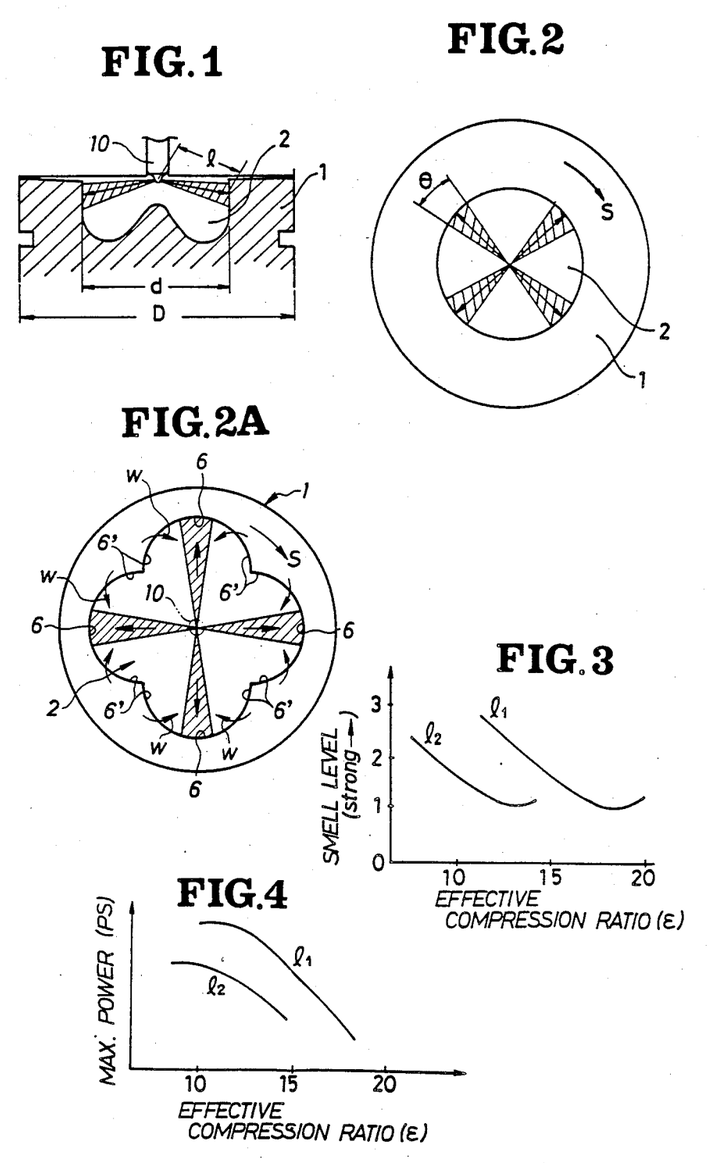
FIG. 1 is a schematic sectional view of a structure of a combustion chamber of a conventional internal combustion engine of a direct injection type.
FIG. 2 is a schematic plan view of a conventional structure of FIG. 1.
FIG. 2A is a schematic plan view of another conventional structure.
FIG. 3 is a graph showing a relationship between a level of a stimulative smell, an effective compression ratio and a distance for a fuel spray.
FIG. 4 is a graph showing a relationship between an effective compression ratio, a maximum power and a distance for a fuel spray.

Conventionally, as shown in FIGS. 1 and 2, a main combustion chamber 2 of a direct-injection internal combustion engine is, generally, of a toroidal shape and is formed by a hollow at a top of a piston 1. As a diameter d of the chamber 2 increases with respect to an inner diameter D of a cylinder, a fuel sprayed from a fuel injection nozzle 10 moves a long distance l. And if the distance increases from a value l1 to l2, a level of stimulative smell of an exhaust degreases in a low speed and low load driving at a same effective compression ratio ϵ, as shown in FIG. 3. If the compression ratio is increased, the level of the smell is also improved.

However, if the effective compression ratio is increased (if the capacity of the chamber 2 is decreased) in order to improve the stimulative smell of the exhaust in the low speed and low load driving, a maximum power decreases. Further, if the distance for the spraying is increased (if the diameter d is increased) for the same purpose, the speed of the squish decreases. Because, the high compression ratio and the long distance l of the fuel spray cause over-early firing in the high speed and high load driving, and further, the low force of the squish requires a long time for the combustion, so that the maximum power, the color of the exhaust and the fuel consumption deteriorate.

Also, a main combustion chamber 2, as shown in FIG. 2A, has already been used. A hollow 2a forming the chamber 2 is provided with some walls 6 against which the sprayed fuel collides. These collision walls 6 are disposed symmetrically with respect to a center 8 of the piston.

In this chamber, squish flows w into the near of the respective collision walls 6 from circumferentially both sides thereof before the end of the compression process of the engine, so that the fuel spray can be combusted sufficiently. However, a swirl (circumferential flow) of a suction gas can not be utilized for mixing the fuel and the air. Because, the swirl of the gas generated in the chamber 2 collides against and is disappeared by inclined walls 6' and 6' at the both sides of the collision walls 6 which are projected toward the center 8 of the piston. Further, the fuel does not flow along the inclined wall 6' from the near of the wall 6. Therefore, the flow along the wall 6 is not substantially formed in the hollow 2a, and thus, the film of the fuel does not, unpreferably, extend or spread, so that the combustion performance can not be improved.

Japanese patent publication Nos. 51-29242, 51-29243 and 51-29244 have disclosed structures in which the fuel spray is not sprayed against corners of the combustion chamber. In this case, since a radius (r) of curvature of the corner is small (i.e., r/R is in a range from 0 to 0.075: R=radius from the nozzle hole to the collision wall), the fuel spray is accumulated after collision, and thus, the speed of vaporization is low, which causes accumulation of dreg of the fuel and deteriorates the performance.

A Japanese laid-open utility model publication No. 57-168729 and a Japanese patent publication No. 49-16881 have disclosed structures in which collision surfaces are curved or are designed to reflect the fuel spray. However, in these structures, when a small amount of fuel is sprayed, the speed of the fuel jet is very small in comparison with that when a large amount of the fuel is sprayed, so that the fuel is hardly reflected. Therefore, the fuel is accumulated on the wall which is intended to reflect the fuel, which causes, disadvantageously, uncombusted gas and the stimulative smell.

A Japanese utility model laid-open publication No. 57-107821, the Japanese utility model publication No. 55-4515, and the Japanese utility model laid-open publication No. 57-139631 have disclosed structure in which a small amount of fuel can be perfectly combusted in the compressed air in the low power driving. However, according to a shape of a hollow, since a swirl or circumferential flow is braked during the compression, there is such a disadvantage that the sprayed fuel is not actually flowed by the swirl. Further, according to the utility model of the above laid-open publication 57-139631, since the radius of curvature of the wall against which the fuel collides is small, an umcombusted fuel is not spread when the small amount of the fuel is sprayed, so that the gas can not combust sufficiently. Further, since the area of the opening of the combustion chamber is large with respect to the area of the top surface of the piston, which, disadvantageously, reduces the forces of a squish and a swirl of the fuel flow in the hollow.

Accordingly, it is an object of the invention to provide a structure in which the stimulative smell in the low speed and low power driving is improved as well as the maximum power, the color of the exhaust, fuel consumption and others are also improved in the high speed and high power driving.

According to the invention, a structure of a main combustion chamber of a diesel engine of a direct injection type in which a main combustion chamber having a peripheral wall which includes a plurality of collision walls and guide walls which are disposed alternately to each other in a circumferential direction of the piston, characterized in that; each guide wall includes an upstream portion and a downstream portion with a boundary therebetween in the direction of the swirl, a radial distance from the center of the chamber to the boundary is shorter than a radial distance from the center of the chamber to other portions and each upstream portion has a longer radius of curvature and a circumferential length than each downstream portion so that the inner periphery of the chamber has a pin-wheel-like shape.

Other and further objects, features and advantages of the invention will appear more fully from the following description of the preferred embodiments of the invention.

DETAILED DESCRIPTION OF THE PREFERRED EMBODIMENTS

Figures 5, 6:
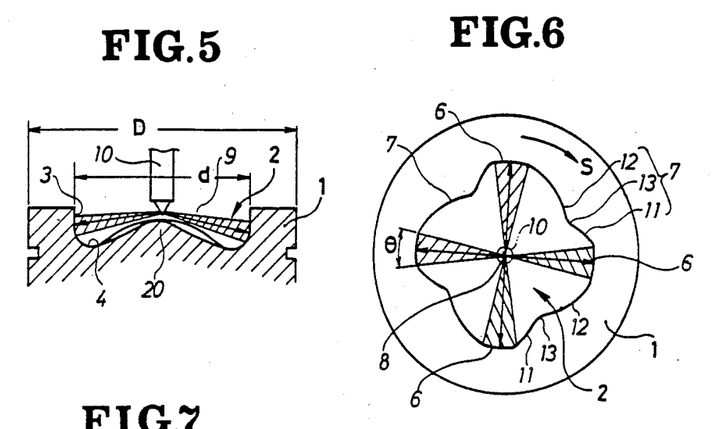
FIG. 5 is a schematic sectional view of a structure of a combustion chamber of an internal combustion engine of a direct injection type according to an embodiment of the invention.
FIGS. 6 to 9 are schematic plan views of a structure of FIG. 5.
Figure 7:
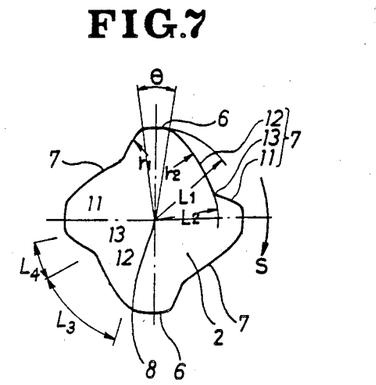

Referring to FIG. 5, a piston 1 is provided at the top with a hollow which forms a main combustion chamber 2 defined by a peripheral wall 3 and a bottom wall 4. Referring to FIGS. 6 and 7, the peripheral wall 3 consists of a plurality of e.g., four, collision walls 6 and four guide walls 7 positioned alternately in a circumferential direction of the piston 1. A fuel injection nozzle 10 having four (same as the number of the walls 6) nozzle holes is disposed at the near of an opening 5 (FIG. 5) of the chamber 2. A center of the injection nozzle 10 coincides with a center 8 of the chamber 2. As shown in FIG. 6, the injection nozzle 10 is so designed that it radiately sprays the fuel only against the respective collision walls 6 so that the collided fuel may flow along the guide walls 7 to form a swirl in a direction of an arrow S.

A distance L1 (FIG. 7) in the radial direction of the piston from the center 8 of the chamber 2 to the wall 6 is in a range from 0.25 to 0.40 times as long as an inner diameter D of a cylinder. If L1/D is smaller than 0.25, the diameter d of the chamber 2 and a distance which the fuel is sprayed become too small, so that the fuel can not sufficiently combust before reaching the walls 6, resulting in increasing of the stimulative smell. If L1/D is larger than 0.40, a thickness of the piston 1 from the inner peripheral wall 3 of the chamber 2 to an outer periphery of the piston 1 becomes too small, so that a thermal load becomes too large to actually use the piston. A circumferential angle of the sprayed fuel from each nozzle hole to the wall 6 is set as 18–25 degrees so that the fuel may not be sprayed to the guide walls 7.

Each guide wall 7 is divided into a downstream portion 11 and an upstream portion 12 in the direction S of the swirl with a boundary 13 therebetween. The boundaries 13 are positioned nearest to the center 8 of the chamber 2 among all wall portions. In other words, the boundaries 13 are projected toward the center 8. A distance L2 from the boundary 13 to the center 2 is in a range from 0.7 to 0.9 times as long as the distance L1 from the wall 6 to the center 8. The wall portions 12 and 11 are curvedly hollowed with respect to the circumferential direction of the piston and have radii r2 and r1 of curvature, respectively. The radius r2 of the upstream portion 12 is twice as long as or more than the radius r1 of the downstream portion 11 (r2≧2r1). The upstream portion 12 may be straight in the plan view in FIG. 6. A circumferential length L3 of the upstream portion 12 is twice as long as or more than a circumferential length L4 of the downstream portion 11 (L3≧2L4). Thus, the main combustion chamber 2 has a pin-wheel-like shape in the plan view.

Figure 8:
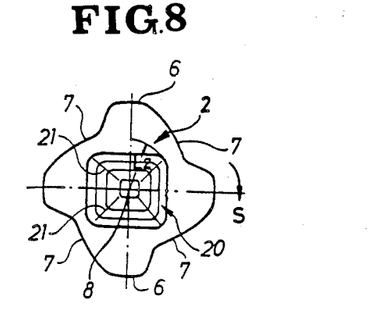

In an illustrated embodiment, as shown in FIG. 5, the bottom wall 4 of the chamber is provided with a nearly pyramid-like projection 20. As shown in FIG. 8, ridges 21 of the projection 20 are same in number as that of the nozzle holes and walls 6. This projection 20 can prevent the sprayed fuel from contacting the bottom wall 4 before colliding with the walls 6, and functions to fill an useless space between the sprayed fuel and the bottom wall 4.

In the chamber 2 of a pin-wheel like shape, the swirl in the direction S in FIG. 6 forms a film of the collided fuel and flows it smoothly. Further, the chamber 2 of above shape has a small opening area with respect to the area of the top surface of the piston 1, which prevents reduction of the force of the squish.

Figure 9:
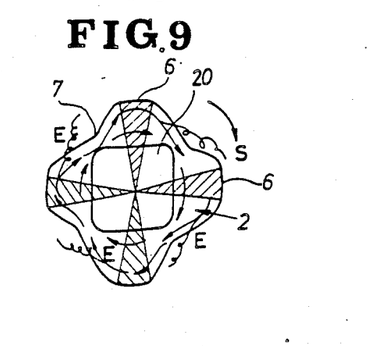

In the chamber 2 having above distances L1 and L2 of which relationship L2/L1 is from 0.7 to 0.9, spiral flows of the fuel are produced in the chamber 2 as indicated by arrows E in FIG. 9. These flows promote the mixing of the sprayed fuel and the air and bring the fuel over the top surface of the piston 1 to effectively utilize the air above the piston 1.

If L2/L1 is smaller than 0.7, the upstream portions 12 incline largely with respect to the walls 6 and prevent the formation of the film of the fuel. If L2/L is larger than 0.9, the portions 11 and 12 do not effectively incline with respect to the wall 6, so that the power degreases similarly as l2 in FIG. 4.

Figure 10:
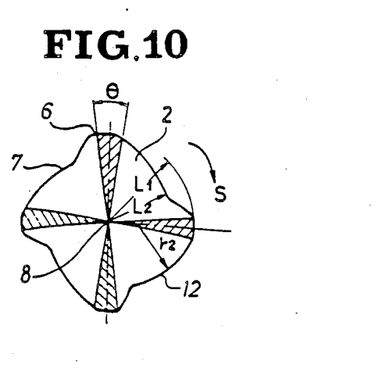
FIG. 10 is a schematic plan view of a structure of other embodiment of the invention.

In the embodiment in FIG. 7, although the centers of the curvature (r1) is apart from the center 8, they may be coincide with the center 8 as shown in FIG. 10.

According to the invention, in the low speed and low power driving, a small amount of the fuel can be sufficiently combusted with the compressed air. Further, the effective compression ratio can be an appropriate value. The sprayed fuel is prevented from contacting the bottom of the chamber. In the high speed and high power driving, the sprayed fuel collides with the walls and flows smoothly as the film formed by the swirl while forming the effective spiral flows.

The structure is also designed to flow the uncombusted fuel over the top of the piston to effectively utilize the air above the piston.

Consequently, the maximum power at the high speed and high power driving is increased, and the color of the exhaust and the fuel consumption are improved.

The present invention can effectively employed in a diesel engine of a direct injection type.

Another embodiments will be described hereinafter. In the following embodiments, same or similar parts and members bear same reference numbers as those in FIGS. 5 to 10 and those parts and members will not be described in details.

Figure 11:
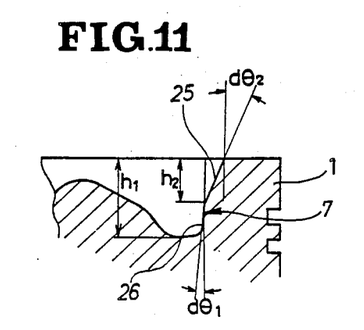
FIG. 11 is a schematic fragmentary enlarged sectional view of another embodiment of the invention.

Referring to FIG. 11, an upper portion 25 having a height h2 of each guide wall 7 is inclined away from the center 8 of the chamber 2 at an angle of $d\theta 2$ which is in a range from about 5 degrees to 15 degrees. Other portions 26 is inclined only slightly at an angle of $d\theta 1$ which is in a range from about 2 degrees to 5 degrees so as to remove the die for casting the piston.

In the low speed and low power driving of this embodiment, a small amount of the fuel sprayed from the nozzle 10 is completely combusted before reaching the walls 6, and the sprayed fuel does not contact the wall 6, so that neither a blue-while smoke nor a stimulative smell was generated.

Figure 12:
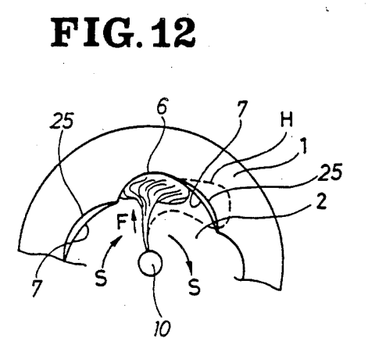
FIG. 12 is a fragmentary plan view of a structure of FIG. 11.
Figure 13:
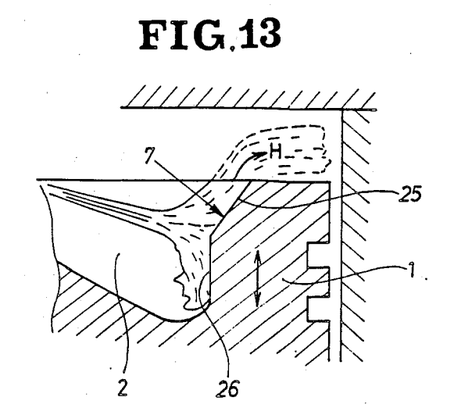
FIG. 13 is a schematic enlarged sectional view of FIG. 11 illustrating a fuel spray and a flame.

In the high speed and high power driving, the amount of the sprayed fuel increases five to eight times as large as the above, and the fuel spray F collides with the walls 6 as shown in FIG. 12. Further, the swirl at a high speed (50 m/sec-100 m/sec) promotes the flow of the fuel in the space as well as the fuel attached on the walls 6, so that the fuel vapors rapidly. And, the flame flows out along the wall 7 from the chamber 2 as shown by dotted lines in FIGS. 12 and 13 when the piston moves downward.

According to the embodiment including the inclined wall portions 25, the fuel and flame can flow smoothly effectively to the above of the piston 1 along the inclined wall portions 25, so that the air above the piston 1 can be utilized effectively, resulting in the increasing of the power of the engine.

In this embodiment, the sprayed fuel F which collides against the walls 6 is divided into a fuel which swirls in the chamber 2 and the fuel which flows to the above of the piston 1 along the inclined wall portions 25.

Figures 14, 15, 16, 17:
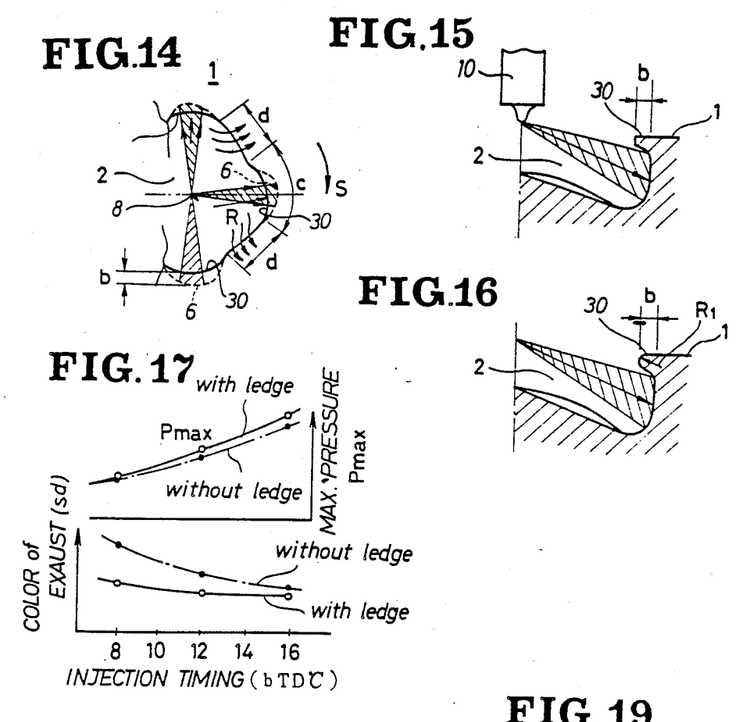
FIG. 14 is a fragmentary plan view of still another embodiment.
FIGS. 15 and 16 are schematic fragmentary sectional view of ledges of respectively different embodiment.
FIG. 17 is a graph showing operation characteristics of an embodiment of FIG. 14.

Referring to FIG. 14, each collision wall 6 is integrally provided at the upper end with a ledge 30 having a radial width b corresponding to a value in a range from 1% to 3% of the inner diameter D of the cylinder. These ledges 30 effectively prevent initial and rapid flow-out of the fuel to the above of the piston 1.

The fuel which collides with the walls 6 flows in accordance with the swirl S through respective sections c including the ledges 30 to sections d without the ledges 30, and then, a part of the uncombusted fuel easily flows from the sections d to the upper space of the piston 1, so that the air above the piston 1 can be utilized effectively for the combustion, and thus, a high power can be obtained.

In the illustrated embodiment, the each section c including the ledge 30 has a nearly same circumferential length as the section d without the ledge 30. The sectional shape of the ledge 30 may be squarish, as shown in FIG. 15, or may be round, as shown in FIG. 16.

The ledges 30 can improve the color of the exhaust and the maximum pressure in the cylinder as shown in FIG. 17 which illustrates characteristics of the structures with and without ledges in connection with the color of the exhaust, the maximum pressure (Pmax) in the cylinder and the injection timings.

In the structures including the ledges 30, when a small amount of the fuel is sprayed in the low power driving, it can sufficiently combust without contacting the ledges 30, so that the color and the smell of the exhaust can be improved similarly to the previously detailed embodiment. In the high power driving, a large amount of the sprayed fuel which collides with the walls 6 flow circumferentially together with the swirl. In this operation, the ledges 30 prevent the initial flow-out of the fuel from the chamber 2. Thus, the sufficient squish is generated, and the fuel can combust sufficiently. And, further, even if the injection timing is retarded to control the maximum pressure (Pmax) in the cylinder, the color of the exhaust can be improved.

Figure 18:
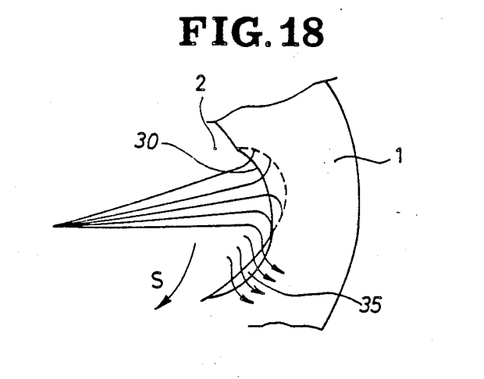
FIG. 18 is a schematic fragmentary plan view of further another embodiment.
Figure 19:
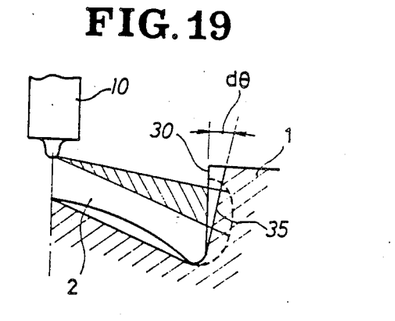
FIG. 19 is a schematic fragmentary sectional view of an embodiment of FIG. 18.

In an embodiment in FIGS. 18 and 19, similarly to the embodiment in FIG. 14, the walls 6 against which the fuel collided are provided at the upper ends with ledges 30, and further, the guide walls 7 are provided with tapered portions 35 at an angle $d\theta 2$ which incline away from the centrer of the chamber 2 so as to facilitate flowing out the fuel to the upper space of the piston 1.

In the high power driving, the ledges 30 prevent the fuel from directly flowing out from the near of the walls 6 to the upper space of the piston 1 and promote the fuel to flow together with the swirl S in the chamber 2, so that the vaporization of the fuel in the chamber 2 is promoted. The fuel which is vaporized and incompletely combusted in the chamber flows out along the tapered portions 35 to the upper space of the piston 1 and is completely combusted.

Therefore, according to this structure, even if the injection timing is retarded to reduced the maximum pressure in the chamber, the fuel can be combusted completely and cleanly, so that the color of the exhaust can be improved and the high performance of the engine can be obtained.

Figure 20:
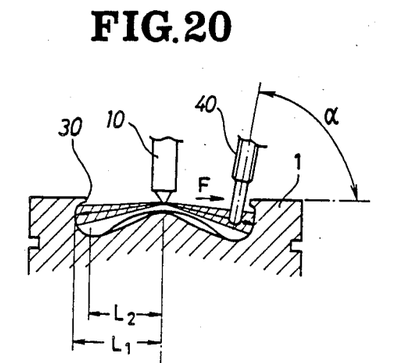
FIG. 20 is a schematic sectional view of another embodiment.
Figure 21:
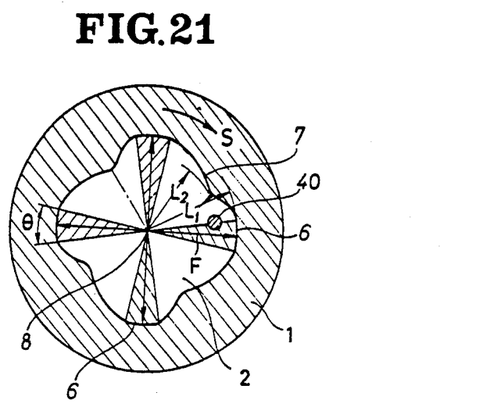
FIG. 21 is a schematic sectional view of an embodiment of FIG. 20.

In an embodiment in FIGS. 20 and 21, a glow lamp 40 is disposed at a position which is adjacent to an upstream side, with respect to the direction of the swirl S, of one wall 6 against which the fuel collide.

The glow lamp 40 is inclined, as shown in FIG. 20, at an angle $\alpha$ with respect to the top surface of the piston 1, and is shifted circumferentially upstream to a center of the spray of the fuel F.

Figure 22:
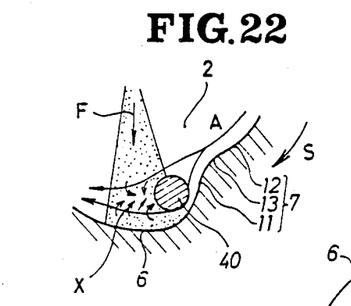
FIG. 22 is a schematic enlarged view of FIG. 21.

According to this structure, a flow A (FIG. 22) along the walls 7 in the chamber 2 is changed into a turbulent flow as indicated by an arrow X at the downstream position of the glow lamp 40 with respect to the direction of the swirl S, so that the mixing of the fuel and the air is promoted, which results in improvements of the startability of the engine, the performance in the high load driving, the color of the exhaust and the fuel consumption.

Since the chamber 2 of the pin-wheel like shape according to the invention has the longer distance L1 between the center 8 to the wall 6 than the conventional structure, the glow lamp 40 can be distant from the nozzle 10. Therefore, it is easy to arranged the glow lamp 40 at the above position. Further, since the distance from the nozzle 10 to the glow lamp 40 is long, the firingability can be improved, and thus, the startability and the combusting performance in the low power driving can be improved.

Figure 23:
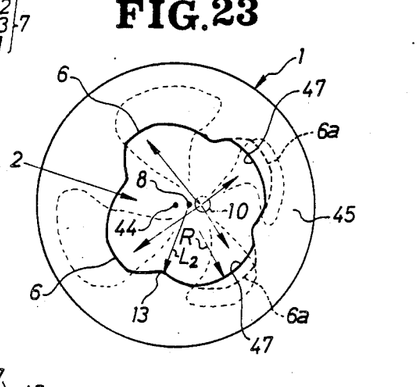
FIG. 23 is a schematic plan view of another embodiment.

In an embodiment in FIG. 23, the center 8 of the combustion chamber 2 is shifted away from the center 44 of the piston 1, and the piston 1 is provided at the top surface with a portion 45 which has a narrower radial width than other portions. The fuel injection nozzle 10 is shifted nearly toward the narrow portion 45 with respect to the center 8 of the combustion chamber 2.

In this piston 1, ledges 47 similar to the ledges 30 in FIG. 14 are provided at, e.g., two collisions walls 6a which are adjacent to the narrow portion 45. The radius R of the inner periphery of each ledge 47 may be substantially same as the radius L2 of the boundary 13 or may be shorter than that.

Figure 24:
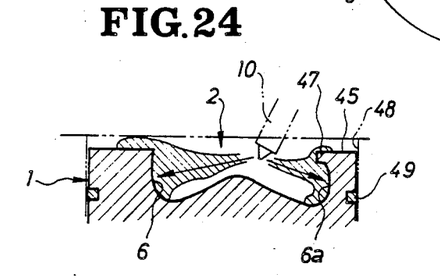
FIG. 24 is a schematic sectional view of an embodiment of FIG. 23.

According to this structure, following effect can be obtained in addition to the effects by the embodiment in FIG. 14. If the ledges 47 were eliminated, a large amount of the fuel flowing out from the chamber 2 flows above the narrow portions 45 and attaches to a portion 48 (FIG. 24) of a cylinder liner adjacent to the portion 45 without completely combusting. Consequently, a lubricant may be diluted and a carbon is accumulated on the liner portion 48, and thus, the cylinder liner and a piston ring 49 are largely worn. However, according to this embodiment, since the ledges 47 effectively prevent the flowing-out of the uncombusted fuel to the liner portion 48, the dilution of the lubricant and the accumulation of the carbon can be prevented, and thus, the durability of the cylinder liner and the piston ring can be improved.

Although the invention has been described in its preferred form with a certain degree of particularity, it is understood than the present disclosure of the preferred form may been changed in the details of construction and the combination and arrangement of parts may be resorted to without departing from the spirit and scope of the invention as hereinafter claimed.

What is claimed is:

1. A structure of a main combustion chamber of a diesel engine of a direct injection type in which a main combustion chamber having a peripheral wall and a bottom wall is formed by a hollow at a top of a piston, above peripheral wall includes a plurality of collision walls and guide walls which are disposed alternately to each other in a circumferential direction of the piston, a fuel injection nozzle having a plurality of nozzle holes is disposed in or at the rear of the combustion chamber, the injection nozzle is designed to radiately spray the fuel only against the collision walls, and the sprayed collided fuel is adapted to flow along the guide walls in one direction while forming a swirl;
    characterized in that;
    each guide wall includes an upstream portion and a downstream portion with a boundary therebetween with respect to the direction of the swirl, a radial distance from the center of the chamber to the boundary is shorter than a radial distance from the center of the chamber to other portions and each upstream portion has a longer radius of curvature and a circumferential length than each downstream portion so that the inner periphery of the chamber has a pin-wheel-like shape, the upstream portions forms smooth walls along which the fuel after collision flows while forming a film of the fuel, the downstream portions forms walls along which the fuel flows from the boundaries, and the circumferential angle of each collision wall is so determined that the fuel sprayed from the nozzle holes collides only with the collision walls;
    each said collision wall does not, in combination with the lower portion of a corresponding said guiding wall, constitute a radial pocket operative to retain a mass of fuel, but comprises a lower portion wall forming a support surface contributing to said swirl in fuel flow.

2. A structure of a main combustion chamber of claim 1 wherein the bottom wall of the chamber is provided with a pyramid like projection of which ridges extend toward the guide walls so that the sprayed fuel from the nozzle holes may not contact the bottom wall before colliding with the collision walls.

3. A structure of a main combustion chamber of claim 1 wherein a ledge projecting toward the center of the chamber is formed at the upper end of the collision wall.

4. A structure of a main combustion chamber of claim 1 wherein ledges projecting toward the center of the chamber are formed at the upper ends of the respective collision walls.

5. A structure of a main combustion chamber of claim 1 wherein the center of the main combustion chamber is shifted away from the center of the piston, the top surface of the piston has a portion which is radially narrower than other portions of the top surface, and a ledge projecting toward the center of the chamber is formed only at the upper end of the collision wall adjacent to the narrow portion of the top surface.

6. A structure of a main combustion chamber of claim 1 wherein the guide walls include inclined portions which extend to the top of the piston and are inclined at an angle in a range from 5 degree to 15 degree away from the center of the chamber.

7. A structure of a main combustion chamber of claim 1 wherein a glow lamp is arranged at the near of the upstream side of one of the collision walls in the main combustion chamber.

8. A structure of a main combustion chamber of a diesel engine of a direct injection type in which a main combustion chamber having a peripheral wall and a bottom wall is formed by a hollow at a top of a piston, above peripheral wall includes a plurality of collision walls and guide walls which are disposed alternately to each other in a circumferential direction of the piston, a fuel injection nozzle having a plurality of nozzle holes is disposed in or at the near of the combustion chamber, the injection nozzle is designed to radiately spray the fuel only against the collision walls, and the sprayed collided fuel is adapted to flow along the guide walls in one direction while forming a swirl;
    characterized in that;
    each guide wall includes an upstream portion and an downstream portion with a boundary therebetween with respect to the direction of the swirl, a radial distance from the center of the chamber to the coundary is shorter than a radial distance from the center of the chamber to other portions and each upstream portion has a longer radius of curvature and a circumferential length than each downstream portion so that the inner periphery of the chamber has a pin-wheel-like shape, the upstream portions forms smooth walls along which the fuel after collision flows while forming a film of the fuel, the downstream portions forms walls along which the fuel flows from the boundaries, and the circumferential angle of each collision wall is so determined that the fuel sprayed from the nozzle holes collides only with the collision walls whereby each said collision wall does not, in combination with the lower portion of a corresponding said guiding wall, constitute a radial pocket operative to retain a mass of fuel, and that the lower portion of each said guiding wall forming an active support surface contributing to said swirl in fuel flow;

the center of the main combustion chamber is shifted away from the center of the piston, the top surface of the piston has a portion which is radially narrower than other portions of the top surface, and a ledge projecting toward the center of the chamber is formed only at the upper end of the collision wall adjacent to the narrow portion of the top surface.

* * * * *